United States Patent

Dopp

[15] 3,661,016
[45] May 9, 1972

[54] DIRECT READOUT BALANCING METHOD AND APPARATUS
[72] Inventor: David S. Dopp, Elk Grove, Ill.
[73] Assignee: Stewart-Warner Corporation, Chicago, Ill.
[22] Filed: July 6, 1970
[21] Appl. No.: 52,528

[52] U.S. Cl..............................................73/462, 73/478
[51] Int. Cl..........................................................G01m 1/22
[58] Field of Search...................73/462, 466, 478, 475, 65, 73/66, 460

[56] References Cited

UNITED STATES PATENTS

| | | |
|---|---|---|
| 2,046,294 | 6/1936 | Lundgren.............................73/478 X |
| 2,663,184 | 12/1953 | Merrill et al............................73/466 |
| 3,040,563 | 6/1962 | Bosch......................................73/65 |
| 3,044,304 | 7/1962 | tenBosch et al.......................73/462 |

Primary Examiner—James J. Gill
Attorney—Augustus G. Douvas, William J. Newman and Norton Lesser

[57] ABSTRACT

A balancing method and apparatus by which a direct readout of the amount of unbalance is provided in order than an operator can determine from a meter reading how much weight to add to an unbalanced body and where to position it. Apparatus for weighing the rotatable workpiece is included as an integral part of the unbalance detecting mechanism with means for attenuating the readout meter signal in accordance with the body weight so that the meter will give an accurate indication of the amount of unbalance in weight times rotational radius units when the body is rotated at a predetermined proportion of the resonant speed of the system.

13 Claims, 7 Drawing Figures

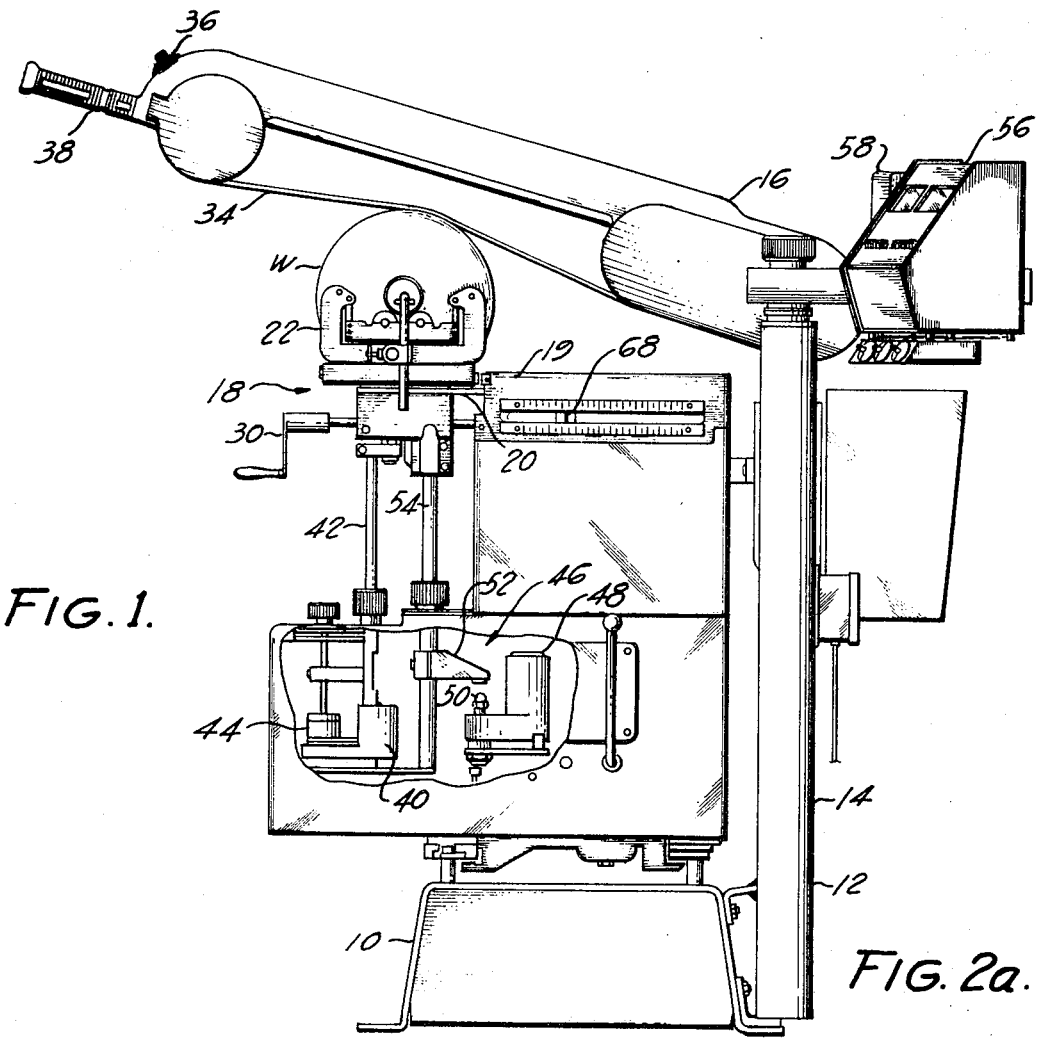
FIG. 1.
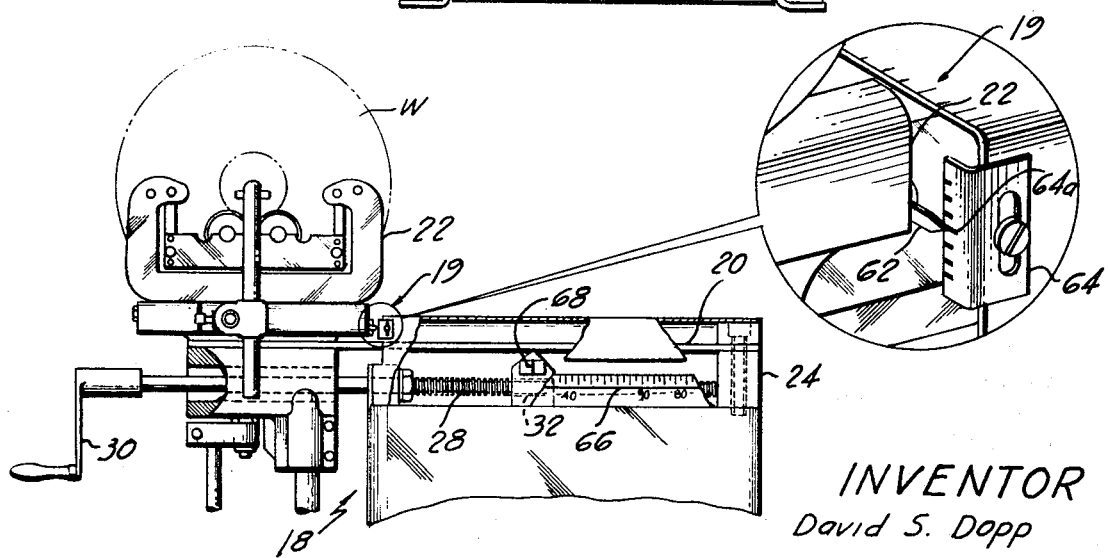
FIG. 2a.
FIG. 2.
INVENTOR
David S. Dopp
By William J. Newman
ATTORNEY INVENTOR
David S. Dopp
By William J. Newman
ATTORNEY

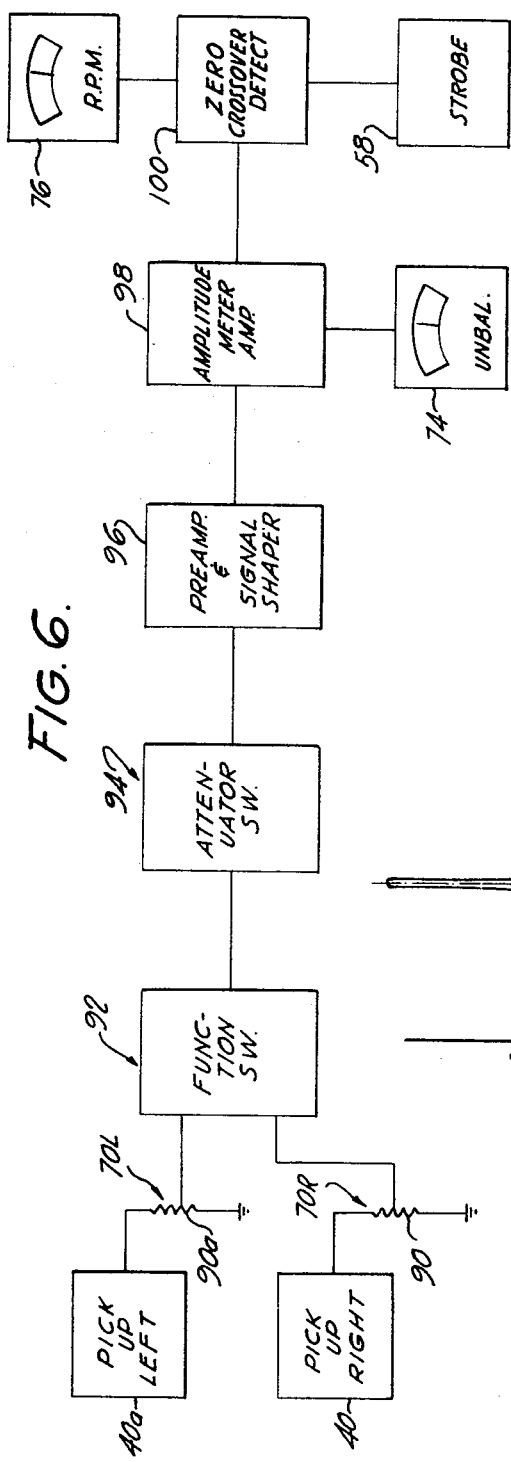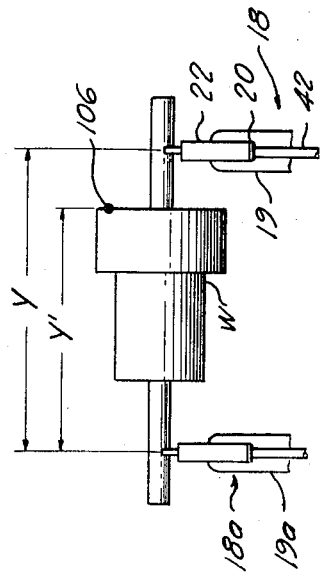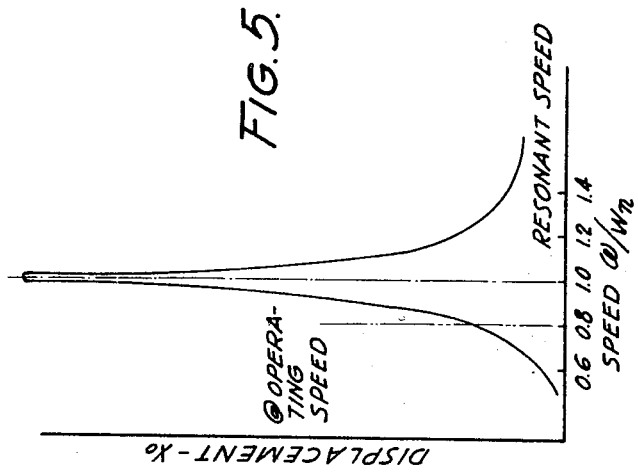

DIRECT READOUT BALANCING METHOD AND APPARATUS

BACKGROUND OF THE INVENTION

1. Field of the Invention

This invention relates to methods and apparatus for the balance of rotatable bodies and more particularly to improved method and apparatus for determining unbalance of rotatable bodies on machines of the cradle type such as shown in U.S. Pat. No. 2,663,184, issued Dec. 22, 1953 to Marcellus S. Merrill and Lowell H. Ericson.

2. Description of the Prior Art

Although balancing machines of the type disclosed in the above identified patent have been commercially utilized for many years, a fundamental problem has existed which precluded the realization of the full benefits of such a device. In spite of the fact that such prior art machines have included meters which give readings pertaining to the amplitude of vibrations caused by unbalance in the workpiece, it has not been possible to obtain an accurate indication of the amount of corrective weight that would cure the unbalance. A trial and error method requiring a number of balancing operations were used in which a known amount of weight was added or subtracted for each operation. The operator used his judgment in selecting a weight for each operation, and if he was not too experienced a large number of separate balancing operations were required.

In the procedure disclosed in the aforementioned patent the meter reading was used to find the critical or resonant speed. However, this reading at resonance was not reliable as an indication of the amount of weight that needed to be added to correct for the unbalance. The apparatus disclosed therein included damping means to prevent violent vibrations at resonance if the unbalance in the workpiece was substantial. This damping factor precluded the use of the amplitude meter as an accurate readout of the amount of unbalance. This may be seen from the following balancing equation:

$$X_0 = m \frac{m'e(\omega/\omega n)^2}{\sqrt{[2(C/C_o)(\omega/\omega n)]^2 + [1-(\omega/\omega n)^2]^2}}$$

wherein:
$X_o$ equals the amplitude of vibration
$m'$ equals the unbalance mass
$m$ equals total mass
$e$ equals eccentricity of the unbalance
$\omega$ equals the frequency of rotation
$\omega n$ equals the critical frequency
$C$ equals the damping, and
$C_c$ equals critical damping.

The above relationship shows that it was impossible to obtain a direct meter readout of the amount of unbalance in the piece being tested because of the presence in the function of the damping factor $C/C_c$. The damping factor is a function of frequency and amplitude of vibration such that it has an appreciable affect on the linearity of the balancing function at and around the system resonance.

SUMMARY OF THE INVENTION

Applicant by this invention provides a method and means by which a balancer of the general type described may be utilized to obtain a direct reading of the amount of unbalance without the trial and error procedures required in the aforementioned patented method and apparatus. It has been found that although such a balancer is capable of being operated at the resonant frequency as described above, it can be operated to determine unbalance more advantageously at a rotational speed which is a predetermined fixed percentage of the resonant frequency (other than 100 percent) during the balancing operation. By so doing, the system is operated in a limited displacement range and limited speed range such that the damping factor can be considered as an insignificant constant. As an alternative the damping means may be eliminated from the system during balancing operations and in any case the balancing equation becomes a simple relationship in which the amplitude of vibration $X_o$ is simply related to the mass $m$ of the part, the mass $m'$ of unbalance and the eccentricity $e$ of the unbalance mass, all other factors now being constant. The equation thus reduces to $X_o = Km'e/m$. It may further be observed that if provisions are made for determining the mass or weight $m$ of the workpiece, a meter which is operable responsive to the amplitude of vibrations can be calibrated to read the amount of unbalance in weight times radius units as long as the meter current is properly attenuated in accordance with the weight measurement.

An apparatus for use as described herein comprises a frame structure with two springs each having one end rigidly mounted on the frame structure and the free end carrying bearing means for supporting a rotatable body at axially specied points. Means are provided which are operable in cooperation with the springs for determining the weight of each respective end of the body along with means for rotating the body at a desired speed. Further means are included for selectively providing an electric signal the amplitude of which is a function of the amplitude of vibration of the unmounted end of one or the other of said springs. A meter which is operable responsive to the electrical signals is provided for indicating the amount of unbalance of a respective body end as well as means for attenuating the signal in accordance with the amount of the weight indicated by the weight indicating means so as to give a direct meter readout in weight times rotational radius units.

The method for setting up a resonant type cradle preparatory to performing a balancing operation and for balancing the rotatable body on the cradle comprises the steps of first locking one of the supports from oscillatory movement, measuring the weight of the end of the body on the unlocked second support utilizing the deflection of a portion of the second support with respect to a fixed point, setting a vibration amplitude meter signal attenuator associated with the second support in accordance with the weight measurement of the previous step, causing the unlocked support with its body end to vibrate to determine its resonant frequency, rotating the body at a predetermined percent of the resonant frequency, fixing a correction weight adjacent said other end of the body in accordance with the vibration amplitude meter reading at a location determined by stroboscopic means, locking the second support and unlocking the first support carrying the one end of the body from oscillatory movement, and repeating the applicable steps to correct for the unbalance in that end of the body.

The principle objects and advantages of this invention will become more apparent by a further reading of this specification, especially when taken in view of the attached drawings.

BRIEF DESCRIPTION OF THE DRAWINGS

FIG. 1 is a side view of a resonant type cradle balancer embodying the teachings of this invention;

FIG. 2 is an enlarged side view of a portion of the balancer of FIG. 1 showing the means for weighing the workpiece on the balancer;

FIG. 2a is a fragmentary isometric view of a portion of the weight calibration indicia;

FIG. 3 is a simplified front view of a portion of the balancer of FIG. 1 showing certain measurement relationships;

FIG. 5 is a graphic representation of the relationship of vibration displacement versus the speed of rotation normalized with the resonant frequency; and FIG. 6 is a block diagram of the electric circuitry used in the balancer of FIG. 1.

DESCRIPTION OF THE PREFERRED EMBODIMENT

Figure 4:
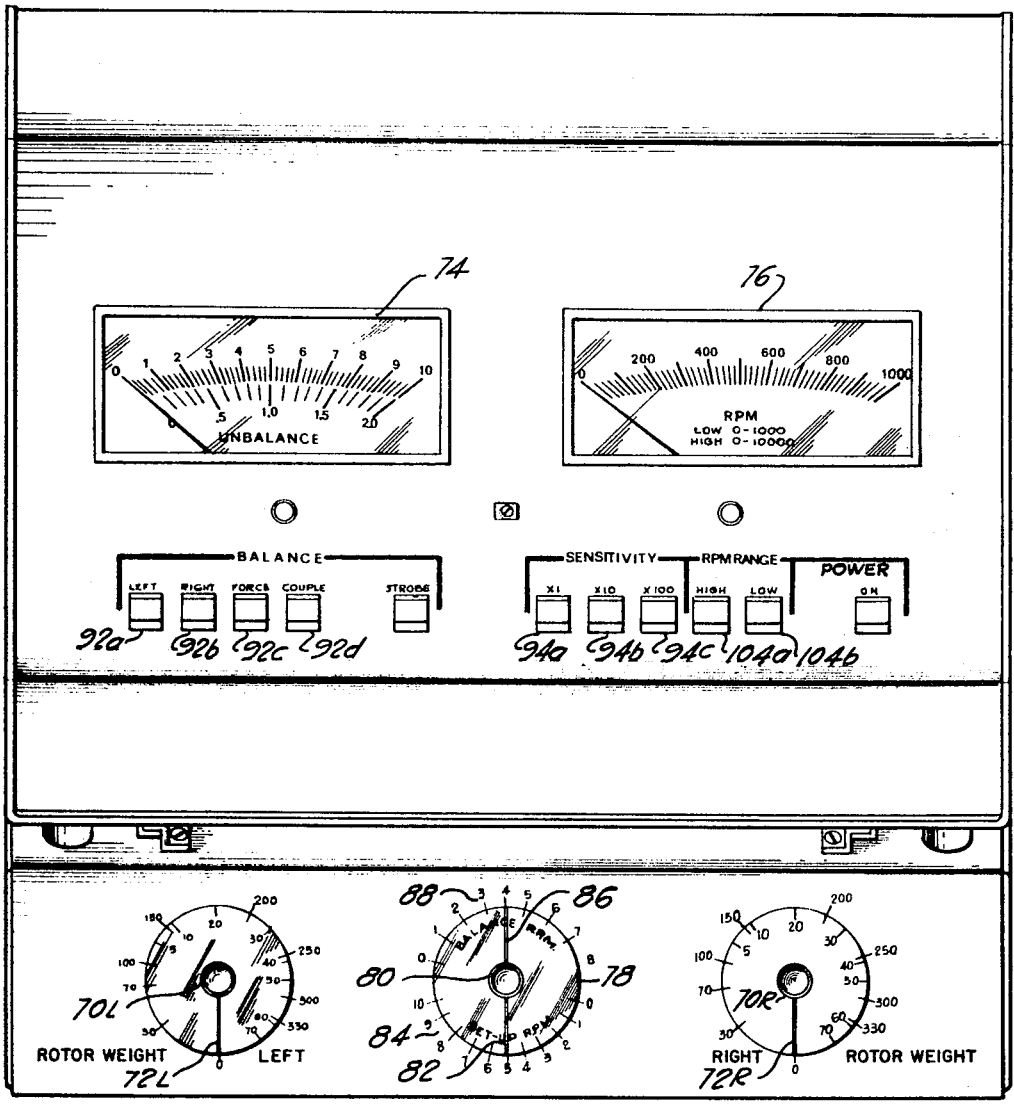
FIG. 4 is a front view of the control panel for the balancer of FIG. 1.

Referring first to FIGS. 1 and 2, there is shown a balancing machine of the resonant cradle type which includes a base structure 10 to which two posts 12 and 14 are attached at its rearward end. A pedestal 19 is fixedly mounted on the base 10 adjacent one of the posts 12 which carries a vibratable support structure 18 for cradling one end of a rotatable workpiece W. A second pedestal 19a and support structure 18a (shown schematically only in FIG. 3) are also mounted on the base 10 in a slidable manner with respect to support structure 18 so as to be adjustable to accommodate different sizes and kinds of rotating bodies to be balanced. Appropriate cross braces (not shown) extend between the two posts 12, 14 on which is slidably mounted a driver unit 16 for positional adjustment between the two posts. The driver unit 16 which will be described in somewhat more detail later may be of the type disclosed in U.S. Pat. No. 2,758,487, issued to L. H. Ericson.

Each of the vibratable support structures 18, 18a includes a vibratory element 20 in the form of a cantilevered leaf spring which carries a bearing structure 22 at its free end for supporting the rotatable workpiece 20. The other end of the leaf spring is fixed by appropriate means 24 to the fixed pedestal 19 with the bottom side of the spring resting on the crested edge of a fulcrum block 26 adapted for movement on the pedestal 19. The fulcrum 26 is movable along the bottom side of the spring 20 by suitable means including a lead screw 28 operable by a crank handle 30 to threadedly cooperate with internal threads in the fulcrum block 26. The two bearing structures, one on each support structure 18, 18a, and the springs 20 associated therewith form a resonant type vibratory cradle in which the body W to be balanced is mounted.

The workpiece W mounted on the bearing structure is rotatable by means of the drive unit 16 which includes a belt 34 driven by an appropriate electric motor and pulley means (not shown) in a manner described in the aforementioned Ericson patent. The unit may be brought down to engage the moving belt 34 with the periphery of the workpiece W. The speed of rotation is controllable by manipulation of a speed potentiometer dial 36 while the starting and stopping of the drive unit is controllable by manipulation of the handle 38 which alternatively energizes or brakes the drive motor as fully described in the aforementioned Ericson patent.

The vibrations of the workpiece on the bearing structures 22 at the free ends of the leaf springs 20 are measured by means of electric signals generated in pickup units 40 which may be of the electromagnetic type disclosed in the aforementioned Merrill patent. These pickups each include a coil and a magnet one of which is fixed with respect to the base 10 and the other of which is fixed to the bearing unit 22 by means of rod 42 so that relative motion therebetween generate an A.C. current in the coil. Adjustable damping means 44 of the type shown in the Merrill patent are provided to prevent excessive oscillations at the resonant frequency of vibrating systems which may be caused by an abnormal amount of unbalance in the workpiece W.

A locking system 46 is also provided for each vibratable support structure in order to prevent vibration thereof during balancing procedures as will be hereinafter described. A locking system comprises an electric motor 48 which can be energized to drive a plunger 50 into or out of engagement with a stopper member 52 fixed to a bearing member 22 by means of rod 54. Thus, when plunger 50 is in its lowered position as shown in FIG. 1, the bearing member 22 on the free end of the spring 20 is free to vibrate. When the plunger 50 is raised, however, to engage the stopper member 52, the vibrating system is prevented from oscillating.

The operation of the balancing machine is controlled by means of a control box 56 which includes various meter switches and dials to be described in more detail later with respect to FIG. 4 of the drawings. Also, a stroboscopic lamp 58 is included to enable the operator to determine the angular position of the unbalance on the workpiece W in a manner well known in the art.

The machine so far described is quite similar to that described in the aforementioned Merrill patent except for the locking system for the two vibratable support structures. In addition the present apparatus includes means for weighing each end of the workpiece W as it sets on its respective bearing structure 22 so that appropriate adjustments may be made in the electric circuit to enable a direct meter readout of the amount of unbalance. The weighing means include a pointer 62 fixed to the bearing means 22 on the free end of the spring 20 and which is registerable with an indicia plate 64 fixed to the pedestal 19. Also included are weight calibrated indicia means 66 located along the path of movement of the movable fulcrum 26 and adapted to coregister with an indicator mark 68 on the fulcrum. The pointer 62, fulcrum mark 68 and indicia 64, 66 are designed such that when the pointer 62 is in coregister with the center indicia mark 64a on indicia plate 64, the fulcrum mark 68 indicates the weight of the respective supported end of the workpiece W on weight scale 66. To determine the weight of the end of the workpiece resting on the support structure 18 the crank 30 is turned to move the fulcrum 26 until the pointer 62 coregisters with the middle mark 64a. The weight of the workpiece end is observed on the scale 66 opposite the fulcrum marker 68.

Since the length of the free ends of the springs or arms are adjusted to provide a certain deflection for respective body weights, the resonant frequency of the vibrating system will be approximately the same regardless of the weight of the body. That is, by the provision of the particular weight determining means shown wherein the deflection of the free ends of the arms are adjusted to a fixed point on the support frame, the vibrating system including the body will have approximately the same resonant frequency, at least within a workable range, regardless of the body weight. Thus, the apparatus may be calibrated for optimum performance at that frequency and all the frequency dependent variables will be minimized.

The weight reading established above is used to enable the operator to adjust the attenuation of the electrical signal derived by the pickup 40 so that a direct meter readout on the control panel 66 may be made of the amount of unbalance in weight times rotational radius units such as inch-ounces or centimeters-grams. Referring to the detailed drawing of the control panel in FIG. 4, the weight reading from the scale indicia 66 (FIG. 2) is dialed into the control panel by means of dial knob 70R or 70L depending upon which end of the workpiece is being measured. The dial knob 70R or 70L is set so that the pointer 72R or L points to the weight reading measured on the weighing scale indicia 66. As long as the speed of rotation of the workpiece W is at a certain predetermined percentage of the resonant frequency of the vibrating system, the amplitude meter 74 will give an accurate reading of the amount of unbalance.

Contrary to the method of the aforementioned Merrill patent, the meter reading of the amount of unbalance is not taken at the critical or resonant speed of rotation, but rather at a speed which is a predetermined percentage of that critical or resonant speed so that the damping factor of the system does not materially affect the operation. As may be seen in the normalized speed versus displacement graph of FIG. 5, the amplitude of displacement rises sharply when the resonant speed is approached from either direction. If the unbalance is of a substantial magnitude, the amplitude of vibration at the resonant speed might be great enough to be dangerous to the machine or operator without the damping mechanism 44. By operating the machine at a predetermined fixed percentage of the critical or resonant speed such as 80 percent thereof, a fairly linear and reasonable amplitude portion of the curve is used at which the damping variables are minimal and a direct meter readout can be obtained. It is preferable, but not a necessary requirement, that the speed of operation be in a range below the resonant speed rather than in the range above the resonant speed merely because it takes less time to bring a workpiece up to the operating speed. This is especially desirable when working with a heavy workpiece which takes a substantial length of time to work up to the operating speed.

The operating speed to be used during any balancing operation is very simply determinable on the apparatus herein disclosed. With the one end of the cradle locked by means of the locking system 46, the resonant frequency of the vibrating system of the other end of the cradle may be established by merely tapping the unlocked end, causing it to vibrate at its natural resonant frequency which is readable on the frequency or RPM meter 76. This resonant frequency of vibration of course is equal to the resonant or critical speed of rotation. A simple calculator 78 provided on the control panel may then be used to determine the 80 percent value of the resonant frequency which is to be used during balancing operation. The dial knob 80 is rotated to set the lower pointer 82 to the resonant frequency on the lower indicia 84 and the upper pointer 86 will point to the 80 percent figure on the upper indicia 88. During the balancing operation the speed potentiometer 36 on the driver unit 16 may be adjusted as the workpiece is being driven until the frequency or RPM meter 76 indicates the computed frequency.

The electronic circuitry for the balancing machine is contained in the control console 56, and since it is essentially of a type which is well known in the art, it is shown only in functional block diagram style in FIG. 6. The electric signals from the pickups 40, 40a associated with the vibratable support structures 18, 18a are attenuated by potentiometers 90, 90a which are operable by the rotor weight dials 7OR, 7OL at the control console 56. From there the attenuated signals are directed through appropriate function switches generally referenced at 92 in FIG. 6, but shown on the control console in FIG. 4 as 92a, 92b, 92c, 92d. These switches select the signals from the appropriate pickup in a well known manner for transmission through the remainder of the circuit. For example, switch 92a selects the signal from the left pickup only, switch 92b selects the signal from the right pickup only, switch 92c causes the signals from the two pickups to be added and switch 92d causes the signal from the two pickups to be subtracted. It is to be noted that the two switches 92c and 92d can be utilized to perform balancing in accordance with the procedures discussed in the aforementioned Merrill patent, while the switches 92a and 92b are used for balancing in accordance with procedures of this invention as will be discussed in more detail in the following section on balancing procedures.

The selected signal from the function switches then goes through appropriate attenuator switches shown at 94 in FIG. 6 and specifically as 94a, 94b, 94c in FIG. 4. These switches are used to attenuate the signal so that the pointer of the amplitude meter 74 will stay on the scale in a well known manner. A preamplifier and signal shaper circuit 96 prepares the signal for the amplitude meter amplifier 93 from which the amplitude meter 74 is energized to give the amount of unbalance reading. An A.C. component of the signal is taken from the amplitude meter amplifier 98 and provided to a circuit 100 which detects the zero crossover point of that A.C. signal. A differentiated signal is provided at that crossover point in time, which signal is utilized to drive the frequency or RPM meter 76. The differentiated pulses are also used to operate the stroboscopic lamp 58 for determining the angular position of the unbalance in the workpiece in a manner well known to the art.

THE SETUP AND BALANCING PROCEDURES

The setup and balancing procedures for the machine described herein are greatly simplified over those previously known. All of the steps of the setup and balancing procedure are performed while the workpiece is on the machine with a minimum number of procedural steps while obtaining an accurate readout of the amount of unbalance of the workpiece.

In accordance with the procedures of this invention each end of the workpiece is worked on separately to determine its unbalance while the other end is held from vibration. In this manner the static unbalance and dynamic unbalance (or in more modern terminology, the force and couple unbalancer) may be corrected more accurately with a minimum number of steps.

The workpiece is placed on the bearing supports 22 of the machine and the first end of the workpiece to be worked upon is selected by operating the desired console switch 92a, 92b. The operation of one of these switches not only selects the desired pickup as previously described with respect to FIG. 6, but also locks the vibrating system associated with the opposite end of the workpiece W by energizing the appropriate locking system motor 48 to drive its respective plunger 50 into engagement with the stop member 52. Thus, assuming the right end of the workpiece W, as viewed by the operator, is to be worked on, he first depresses the right end switch 92b to select the right pickup 40 and lock the lefthand support structure 18a. The weight of the right end of the workpiece is then measured by means of the weight determining means. That is, the crank 30 is rotated to move the fulcrum 26 along the underside of the leaf spring 20 until the pointer 52 on the spring supporting bearing structure 22 is in register with the middle indicia 64a on the indicia plate 64 attached to the pedestal portion 19 of the right side support structure. The position of fulcrum 26, as indicated by the position of the mark 58 thereon with respect to the indicia 66, is a measure of the weight of the end of the workpiece W supported by the support structure 18. This weight indication is then dialed into the system by the right hand rotor weight dial 7OR by turning the pointer 72R to the appropriate weight reading. It is to be noted that the weight of the left end of the weight W may be measured at this time by proper operation of switch 92a and the manipulation of the fulcrum 26 at that end, or it may be accomplished later in the procedure after the right end has been fully tested and balanced. The invention herein, of course, contemplates either procedure.

After setting the system for the established weight, it is necessary to determine the resonant frequency of the right hand vibrating system. This is accomplished by tapping that end with the other end locked to bring it into oscillation. Shortly thereafter the system will settle down to a stable oscillation frequency, the magnitude of which may be read on the frequency meter 76. The appropriate RPM range switch 104a, 104b may be operated to bring the reading range of the meter within the most readable portion of the meter scale.

As described earlier in this specification, the unbalance measurement is to be made at a speed which is 80 percent of the resonant frequency so as to operate along a more linear portion of the speed versus displacement curve and at a vibration amplitude level which will minimize the affect of the damping means 44. The 80 percent of resonance speed is easily computed by the calculator 78 merely by turning the knob 80 so that the lower pointer 82 registers with the frequency indicated by the meter 76. The balancing speed will then be indicated by the pointer 86 on the top scale 88.

The workpiece W has until this time been merely resting on the bearing supports 22 and is now ready to be brought up to balancing speed to determine the amount of unbalance of its right end. The driver unit 16 is brought down to engage the motor driven belt 34 with the periphery of the workpiece W and the speed thereof is adjusted by the speed potentiometer 36 until the frequency meter 76 reads the 80 percent of resonance balancing speed computed on calculator 78. When at the operating speed the unbalance meter indicates the amount of unbalance in weight times radius units. The amount of weight to be added to the workpiece may then be calculated by dividing the radial measurement of the position that the weight is to be placed into by the meter reading figure. For example, if the amount of unbalance registered on the meter 74 is 20 inch-ounces, it may be corrected by placing a 2 ounce weight at a 10 inch radius from the axis of rotation, by a 5 ounce weight at a 4 inch weight, etc.

An additional correction has to be made to the amount of weight if the plane in which the weight to be added is located a substantial distance from the plane in which the right hand structure 18 is located. This may be better understood from the schematic drawing of FIG. 3. Assume that the correction weight is to be added at the point referenced 106 to overcome the unbalance in the right side of the workpiece W. Since the lefthand support structure 18a is locked from vibration, a moment is created around the axis formed by the locked bearing by the unbalance in the part W. This moment is measured at the distance Y from the axis of this moment, but since the correction weight is to be located a distance Y' from the axis of this moment, the meter reading determined amount of unbalance must be reduced by the ratio Y'/Y. This, in the previous example, if Y'/Y equals 0.8, the actual amount of unbalance at the point 106 is 16 inch-ounce rather than 20 inch-ounce.

The angular placement of the corrective weight is established by the normal stroboscopic means well known in the art. That is, the position of the image of a chalk mark, or the like, is observed under the strobe light as the workpiece is being rotated at the below resonant speed and the workpiece is then stopped so that the chalk mark is at some predetermined rotational angular position, with the weight being applied at the strobe light viewed position of the chalk mark. The particular angular relationship, of course, is determined by the type of pickup used and the phase shifting of the signals in the electronic circuitry as is well known in the art.

The balancing procedures for the left end of the workpiece W are essentially the same as that described for the right end. The left button 92a is depressed which locks the right support structure, unlocks the left, and sets the circuit for processing the signal from the lefthand pickup 40. The left end of the workpiece is weighed by varying the position of the fulcrum on the left side until the indicia 62, 64a coregister and the weight read on the indicia 66. The left rotor weight signal and attenuator 70L is then set to the determined weight reading.

It is preferable, but not absolutely necessary, to use the same operating speed for the left end as was used for the right. Therefore, the lefthand vibrating system is set so that its resonant frequency is equal to the resonant frequency established for the righthand vibrating system by varying the position of the fulcrum 26 on the lefthand side while the system is vibrating after being tapped until the frequency meter 76 reads the same resonant frequency. The primary reason for establishing the same resonant frequency is because it is then not necessary to change the speed of the driver unit 16 and the speed potentiometer 36 may be left at its previously fixed position. The workpiece W is again ready to be brought up to operating speed and the amount of unbalance determined from the amplitude meter 74 to determine the weight to be added to the left end in the same manner as described for the righthand side.

After the lefthand side has been measured and corrected, the right side should again be checked to see if there is any change; if so, this indicates the unbalance was of the couple type rather than force type and the procedure may then be repeated for the right side, adding or subtracting a weight as indicated by the meter reading. Another check should then be made of the lefthand side, and under ordinary circumstances this should be all that is required. If the unbalance of the piece was merely a force unbalance, with no couple unbalance present, then the piece would probably be in balance after the first procedures on the right and left sides.

While there has been described herein a preferred embodiment of an apparatus and method for balancing rotatable parts, it is understood that modifications and additions may be made thereto without materially deviating from the teachings herein. It is therefore intended to be bound only by the scope of the appended claims.

What is claimed is:

1. In a balancing apparatus a frame structure, two horizontally arranged parallel leaf springs, means for rigidly mounting like ends of the springs on the frame structure, bearing means on the free ends of the springs for supporting a rotatable body at axially spaced points, a fulcrum for each spring positioned intermediate each spring end, means for adjustably moving the position of each fulcrum with respect to the ends of its respective spring to locate the respective free end in a predetermined position, means for rotating the body at a desired speed, and means for selectively providing an electric signal the amplitude of which is a function of the amplitude of vibration of the free end of one or the other said springs, the improvement comprising means for indicating each said spring free end is in the respective predetermined position, indicia means along the path of movement of each of said fulcrums calibrated to indicate the weight required to locate said spring free ends in the respective predetermined position, a meter operable responsive to said electric signals for indicating the amount of unbalance of a respective body end as measured at a predetermined rotating speed, and means for attenuating said signal in accordance with said weight indicating means to give a direct meter readout in weight times rotational radius units.

2. In the balancing apparatus of claim 1 wherein means are provided for selectively locking one or the other of the spring free ends from movement.

3. In the balancer of claim 1 wherein said meter and said attenuating means are calibrated to give a direct meter readout at a predetermined rotational speed within 30 percent of but not at the resonant speed of the body and ends.

4. In a balancing apparatus having a frame structure, two horizontally arranged parallel leaf springs, means for rigidly mounting like ends of the springs on the frame structure, bearing means on the free ends of the springs for supporting a rotatable body at axially spaced points, a fulcrum for each spring positioned intermediate its ends, means for adjustably moving the position of each fulcrum with respect to the ends of its respective spring, means for rotating the body at a desired speed, and means for selectively providing an electric signal a characteristic of which is a function of the amplitude of vibration of the free end of one or the other of said springs, the improvement comprising first indicia means carried by the portion of each arm between said fulcrum and its respective free end, second indicia means carried by said frame structure and adapted to coregister with each of said first indicia means for a predetermined relationship between the weight of said body and the length of the free end of said arm, third indicia means located along the path of movement of each of said fulcrums for registration therewith calibrated to read the weight required to cause the coregistration of said first and second indicia means for respective positions of said fulcrum, a meter operable responsive to said electric signals calibrated to indicate the amount of unbalance of a respective body end as measured at a rotating speed of the body differing by a predetermined percentage from the resonant speed of said body and spring end and means for affecting the characteristic of said signal in accordance with the weight indicated by said fulcrum and third indicia means to give a direct meter readout in weight times rotational radius units.

5. In the balancing apparatus of claim 4 wherein means are provided for selectively locking one or the other of the free ends of said springs from movement.

6. In the balancer of claim 4 wherein said meter and said attenuating means are calibrated to give a direct meter readout at a predetermined rotational speed within 30 percent of but not at the resonant speed of the body and ends.

7. A balancing apparatus comprising a frame structure, two springs each having one end rigidly mounted on the frame structure, bearing means on the opposite ends of the springs for supporting a rotatable body at axially spaced points, means operable in cooperation with said springs for determining the weight of each respective end of the body, means for rotating the body at a desired speed, means for selectively providing an electric signal the amplitude of which is a function of the amplitude of vibration of the unmounted end of one or the other said springs, a meter operable responsive to said electric signals for indicating the amount of unbalance of a respective body end, and means for attenuating said signal in accordance with said weight indicating means to give a direct meter readout in weight times rotational radius units.

8. In the balancer of claim 7 wherein said meter and said attenuating means are calibrated to give a direct meter readout at a predetermined rotational speed within 30 percent of but not at the resonant speed of the body and ends.

9. A method of setting up a cradle in a resonant cradle type balancer preparatory to performing balancing operations on a rotatable body which cradle is provided with spaced apart resilient cantilever supports having bearings on the free ends of the supports carrying the rotatable body comprising the steps:
 a. locking a first one of the supports from oscillatory movement;
 b. adjusting the free length of the unlocked second support carrying the rotatable body in accordance with the weight of said body by utilizing the deflection of a portion of the second support with respect to a fixed point to determine the weight of said body adjacent said second support;
 c. setting a vibration amplitude meter signal attenuator associated with the second support in accordance with the weight measurement of step b;
 d. causing the unlocked support with its body end to vibrate to determine its resonant frequency;
 e. rotating the rotatable body at a predetermined percentage of said resonant frequency to thereby determine the unbalance weight in said body adjacent said unlocked second support;
 f. locking the second support and unlocking the first support from oscillatory movement;
 g. adjusting the free length of the unlocked first support carrying the rotatable body in accordance with the weight of said body by utilizing the deflection of a portion of the first support with respect to a fixed point;
 h. setting a vibration amplitude meter signal attenuator for said first support in accordance with the weight of said one body end on the first support, and
 i. rotating the rotatable body at said percentage of said resonant frequency to thereby determine the unbalance weight in said body adjacent said unlocked first support.

10. In the method of claim 9 wherein the resonant frequency of the body end on said first support equals the resonant frequency of the body end on said other support.

11. A method of balancing a rotatable body on a cradle of a resonant cradle type balancer having cradle spaced apart resilient cantilever supports with bearings on the free ends of the supports carrying the rotatable body comprising the steps:
 a. locking a first one of the supports carrying one end of said body from oscillatory movement;
 b. adjusting the free length of the unlocked second support carrying the rotatable body in accordance with the weight of said body by utilizing the deflection of a portion of the second support with respect to a fixed point to determine the weight of the other end of said body adjacent said second support;
 c. setting a vibration amplitude meter signal alternator associated with said second support in accordance with the weight measurement of step b, said meter being calibrated to read unbalance movement directly at a predetermined percent of the resonant speed of rotation;
 d. vibrating the unlocked support with said other body end to determine its resonant frequency;
 e. rotating the body at a predetermined percent of the resonant frequency to thereby determine the unbalance weight in said body adjacent said unlocked second support;
 f. fixing a correction weight adjacent said other end of said body in accordance with the vibration amplitude meter reading at a location determined by stroboscopic means;
 g. locking the second support and unlocking the first support from oscillatory movement;
 h. adjusting the free length of said unlocked first support carrying the rotatable body in accordance with the weight of said body by utilizing the deflection of a portion of said first support relative a fixed point to determine the weight of said body adjacent said first support;
 i. setting a vibration amplitude meter signal alternator for said first support in accordance with the weight of said one body end on the first support;
 j. rotating the body at said predetermined percent of the resonant speed of step e to determine the unbalance weight in said body adjacent said first support; and
 k. fixing a correction weight adjacent said one end of the body in accordance with the vibration amplitude meter reading at a location determined by the stroboscopic means.

12. In the method of claim 11 wherein the resonant frequency of the body end on said first support equals the resonant frequency of the body end on said other support.

13. In the method of claim 12 wherein the rotational speed of steps e and j is within 30 percent of but not equal to the resonant frequency.

* * * * *